(12) United States Patent
Davies

(10) Patent No.: US 10,248,549 B1
(45) Date of Patent: Apr. 2, 2019

(54) SYSTEMS AND METHODS FOR DETECTION OF UNTESTED CODE EXECUTION

(71) Applicant: Citrix Systems, Inc., Fort Lauderdale, FL (US)

(72) Inventor: Jonathan J. Davies, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/801,400

(22) Filed: Nov. 2, 2017

(51) Int. Cl.
*G06F 8/30* (2018.01)
*G06F 11/36* (2006.01)

(52) U.S. Cl.
CPC ............ *G06F 11/3676* (2013.01); *G06F 8/30* (2013.01); *G06F 11/3612* (2013.01); *G06F 11/3624* (2013.01); *G06F 11/3664* (2013.01)

(58) Field of Classification Search
CPC .................................................. G06F 11/3676
USPC ......................................... 717/124, 130, 131
See application file for complete search history.

(56) References Cited

U.S. PATENT DOCUMENTS

| | | | | |
|---|---|---|---|---|
| 6,212,675 | B1 * | 4/2001 | Johnston ............. | G06F 11/3664 714/38.14 |
| 6,721,941 | B1 * | 4/2004 | Morshed ............. | G06F 11/3612 709/217 |
| 7,292,970 | B1 * | 11/2007 | Hurlock ........... | G01R 31/31835 703/13 |
| 2002/0095661 | A1 * | 7/2002 | Angel ................. | G06F 11/3612 717/130 |
| 2005/0160405 | A1 * | 7/2005 | Lunia ........................ | G06F 8/41 717/124 |
| 2007/0250815 | A1 * | 10/2007 | Bendapudi .......... | G06F 11/3676 717/124 |
| 2008/0022262 | A1 * | 1/2008 | Prakash .............. | G06F 11/3676 717/124 |
| 2013/0232473 | A1 * | 9/2013 | Braun ................. | G06F 11/3676 717/129 |
| 2015/0169431 | A1 * | 6/2015 | Ivankovic ........... | G06F 11/3676 717/124 |
| 2016/0210215 | A1 * | 7/2016 | Shani .................. | G06F 11/3495 |
| 2017/0083430 | A1 * | 3/2017 | Meerovich .......... | G06F 11/3676 |

* cited by examiner

*Primary Examiner* — Qing Chen
*Assistant Examiner* — Clint Thatcher
(74) *Attorney, Agent, or Firm* — Fox Rothschild LLP; Robert J. Sacco; Carol E. Thorstad-Forsyth

(57) ABSTRACT

Systems and methods for improving the quality of a first software product. The methods comprise performing operations by a computing device to run the first software product having source code modified based on code coverage data gathered during testing of the first software product. The code coverage data identifies at least one first portion of the source code which was executed at least once during the testing and identifies at least one second portion of the source code which was not executed during the testing. The methods also comprise: automatically detecting when an execution of the second portion is triggered while the first software product is being used by an end user; and automatically performing a notification action in response to said detecting.

20 Claims, 8 Drawing Sheets

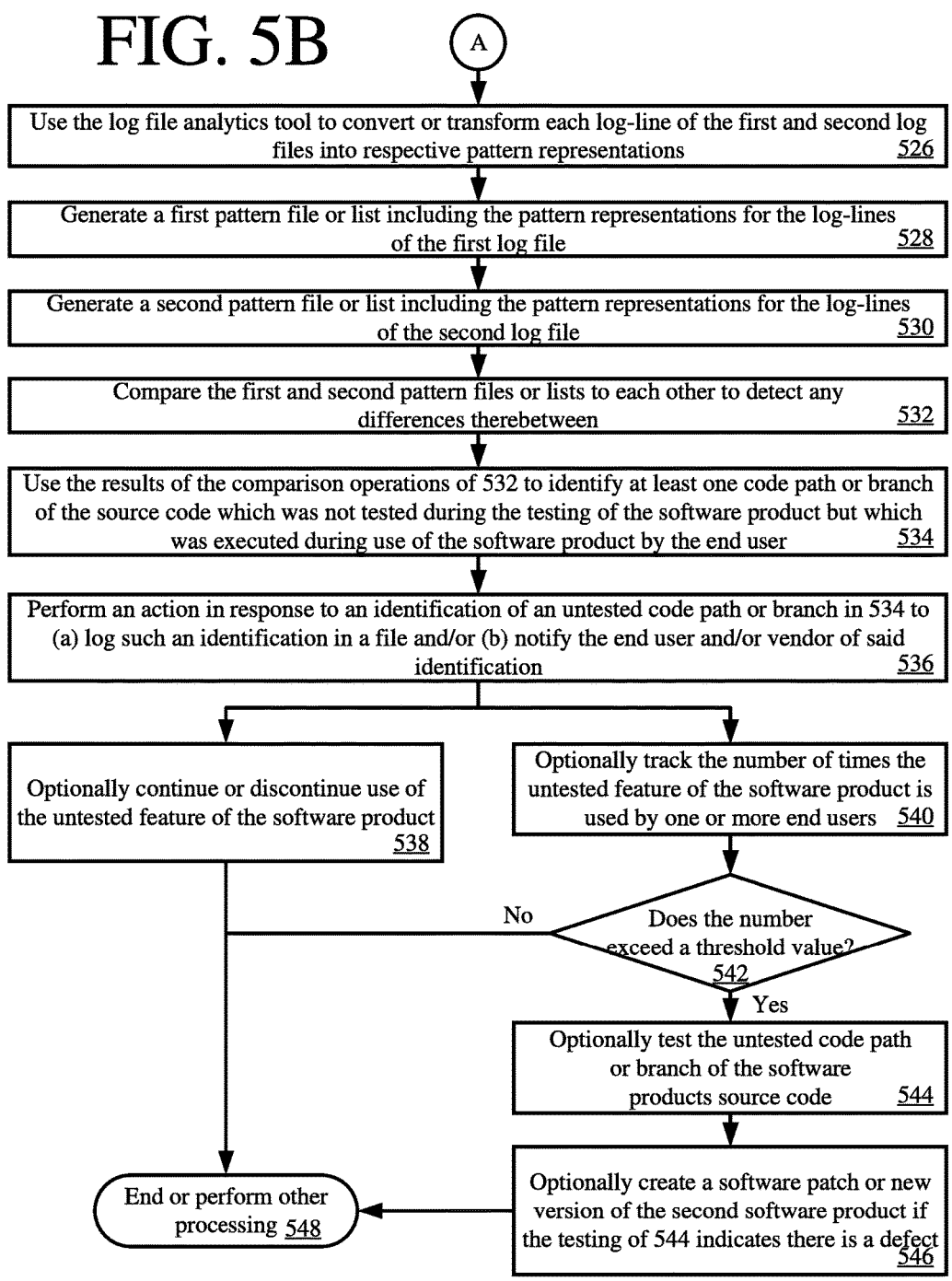

SYSTEMS AND METHODS FOR DETECTION OF UNTESTED CODE EXECUTION

BACKGROUND

Statement of the Technical Field

The present disclosure relates generally to computing systems. More particularly, the present disclosure relates to implementing systems and methods for improving the quality of a software product through the detection of untested code execution.

Description of the Related Art

Traditionally, software products are never exhaustively tested. There will always be code paths that are not exercised during the running of tests. In practice, it would be prohibitively expensive to exhaustively test every code branch. For each code path that has not been tested, the vendor of the product does not know whether the code works as intended. Thus, there is a risk of a defect in the product.

SUMMARY

The present disclosure concerns implementing systems and methods for improving the quality of a software product. The method comprises performing operations by a computing device to run the software product having source code modified based on code coverage data gathered during testing of the software product. The code coverage data identifies (a) at least one first portion of the source code which was executed at least once during the testing and (b) at least one second portion of the source code which was not executed during the testing. The first portion and second portion may each comprise one or more code paths. While the software product is being used by an end user, a detection is automatically made when an execution of the second portion is triggered. In response to the detection, a notification action is automatically performed. The notification action can include, but is not limited to, logging a warning message for said detecting, sending an electronic communication from the computing device to a remote device of the software product's vendor, and/or alerting the end user of the detecting. The detecting can be made at run time of the second portion.

In some scenarios, the methods also comprise: using the code coverage data to identify which code paths of the source code were tested at least once during the testing and which code paths of the source code were not tested during the testing; and modifying the source code by inserting a command for taking the notification action at the beginning of each code path found to have been untested.

In those or other scenarios, the methods comprise: tracking a number of times the second portion is used by at least the end user; determining if the number exceeds a threshold value; and testing the second portion if a determination is made that the number exceeds the threshold value. A software patch or new version of the software product may be created if the second portion's testing indicates that there is a defect.

BRIEF DESCRIPTION OF THE DRAWINGS

The present solution will be described with reference to the following drawing figures, in which like numerals represent like items throughout the figures.

FIGS. 5A-5B (collectively referred to herein as FIG. 5) provide a flow diagram of an illustrative method for improving the quality of a software product through the detection of untested code execution.

DETAILED DESCRIPTION

Figure 1:
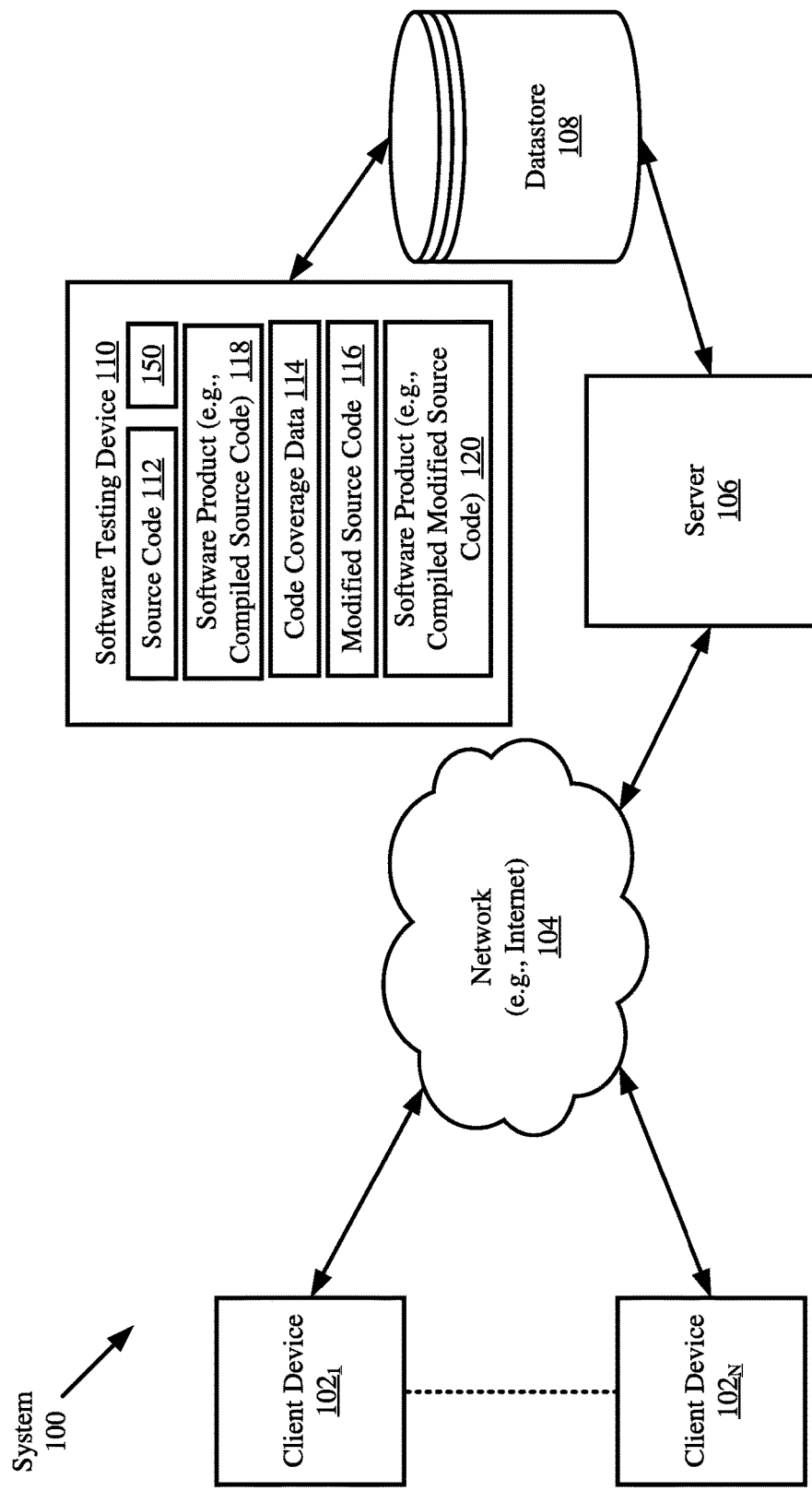
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In some scenarios, untested code is being executed by computing devices. The present solution provides warnings or alerts to the product's vendor ("phone home") and/or the end user (e.g., via a user-facing alert) that such code is being executed. For the vendor, the warnings/alerts provide a data-driven way to increase product quality. There are two different ways to provide such warnings/alerts. These two solutions will be discussed separately below.

First Solution

The present solution has many novel features. For example, the present solution is able to: detect which portions of a software product were not tested during a testing process; and automatically notify a vendor and/or end user that an untested portion of the software product is being executed while the software product is in use. The automatic detection is achieved using code coverage data generated during the testing process. Notably, this is a new use of code coverage data. Traditionally, code coverage data has exclusively been used to inform of a new test's creation (and not to modify the source code as described herein).

The notification is useful to the end user so that the end user can decide whether or not to proceed with using the untested feature(s) of the software product in real-time or near real-time. This notification is useful to the vendor so that the vendor can: track the number of times a particular untested feature(s) of the software product are used by one or more end users; and determine if the number exceeds a threshold value. If so, the vendor can test the untested feature(s) of the software product. Based on results of the additional testing, the vendor can create and distribute a software patch or new versions of the software product to end users. The present solution is not limited to the measures described here. The vendor and/or end user can take other measures in response to the notification(s).

Referring now to FIG. 1, there is provided an illustration of an illustrative system 100. System 100 is generally configured to automatically detect untested portions of a software product being executed by client devices. Accordingly, system 100 comprises a plurality of client devices 102₁, ..., 102ₙ, a network 104, a server 106, a datastore 108, and a software testing device 110.

During product development, source code 112 is generated. Illustrative source code is provided below.

```
...
if C
then X
else Y
...
```

The source code 112 is then compiled to produce a software product 118. Source code and techniques for compiling the same are well known in the art, and therefore will not be described herein. Any known or to be known source code and/or technique for compiling the same can be used herein without limitation.

The software product 118 is then tested through a sequence of test cases 150 by the software testing device 110 in accordance with a testing process. Processes for testing a software product are well known in the art, and therefore will not be described herein. Any known or to be known process for testing a software product can be used herein without limitation. Notably, the software product is not exhaustively tested. In practice, it is prohibitively expensive to exhaustively test every code path or branch of the source code. Accordingly, only some of the code paths or branches defined in the source code are tested. A code path or branch comprises a route through a given part of code being executed. In some scenarios, the route is defined by a portion of the source code including an "if" statement and/or an "else" statement. For example, a portion of source code reads "if C then X else Y". In this case, after evaluating condition C, there are two routes, namely X and Y. The present solution is not limited to the particulars of this example.

The software testing device 110 gathers code coverage data 114 while the software product 118 is being tested. The code coverage data 114 includes first information describing the degree to which the source code 112 of a software product 118 is executed when a particular test is performed. A software product with a high code coverage has had more of its source code executed during testing, and therefore is considered as having a lower chance of containing undetected software bugs. The code coverage data 114 includes second information indicating which portions of the source code (or code paths) were executed at least once during testing, and which portions (or code paths) were not executed during the testing. Illustrative code coverage data is provided below.

| ... | |
| if C | tested |
| then X | tested |
| else Y | untested |
| ... | |

In some scenarios, a plurality of different tests are performed to test a number of different features of the software product 118. Accordingly, different code coverage data is generated during each test. The code coverage data for the plurality of different tests are combined together to generate combined code coverage data. The code coverage data 114 may include the combined code coverage data.

Next, the software testing device 110 uses the code coverage data 114 to identify which code portions (or code paths) of the software product's source code were not tested. The source code is modified based on results of this analysis so that a detection can be made at run time when a user has used the software product 118 in such a way that an untested code path or branch execution is triggered. More particularly, the source code is modified by inserting code for taking an action at the beginning of each code path or branch found to have been untested. Illustrative modified source code is provided below.

```
...
if C
then X
else raise_event( ); Y
...
```

The source code modification can be performed manually or automatically, and result in modified source code 116. The action to be taken can include, but is not limited to, notifying a vendor that a particular code path or branch is being executed or has been executed during end user use of the software program, logging a message (e.g., a warning message) to a log file, and/or notifying a user of the software program that execution of an untested feature or code path has been triggered. The vendor notification can include, but is not limited to, an email or other electronic communication. The user notification can include, but is not limited to a user-facing alert on a currently displayed window and/or in a newly displayed window.

The modified source code 116 is then compiled, built or assembled to produce a software product 120. The software product 120 is then released or provided to an end user. When the software product 120 is run on a client device $102_1, \ldots,$ or $102_N$, execution of untested features are detected and flagged. Notifications of such detection are provided to the user and/or vendor. The user notification can be of interest to the user so that the user can make a more informed decision as to how to use the software program 120 (e.g., whether or not to use an untested feature at any given time).

The vendor notification can be sent from the client device $102_1, \ldots,$ or $102_N$ to the server 106 over network 104 (e.g., the Internet), and/or optionally stored in a datastore 108. The stored vendor notifications may be used by the vendor to determine if a new test needs to be added for a particular feature, a software patch needs to be developed, and/or a new version of the software needs to be developed. The stored vendor notifications can also be used to determine which features are more popular to their customers than others. This information can be used when updating the software program or creating new software programs.

For example, in some scenarios, the vendor uses the notification to: track the number of times a particular untested feature(s) of the software product are used by one or more end users; and determine if the number exceeds a threshold value. If so, the vendor can test the untested feature(s) of the software product 120. Based on results of the additional testing, the vendor can create and distribute a software patch or new versions of the software product to end users. The present solution is not limited to the measures described here.

Figure 2:
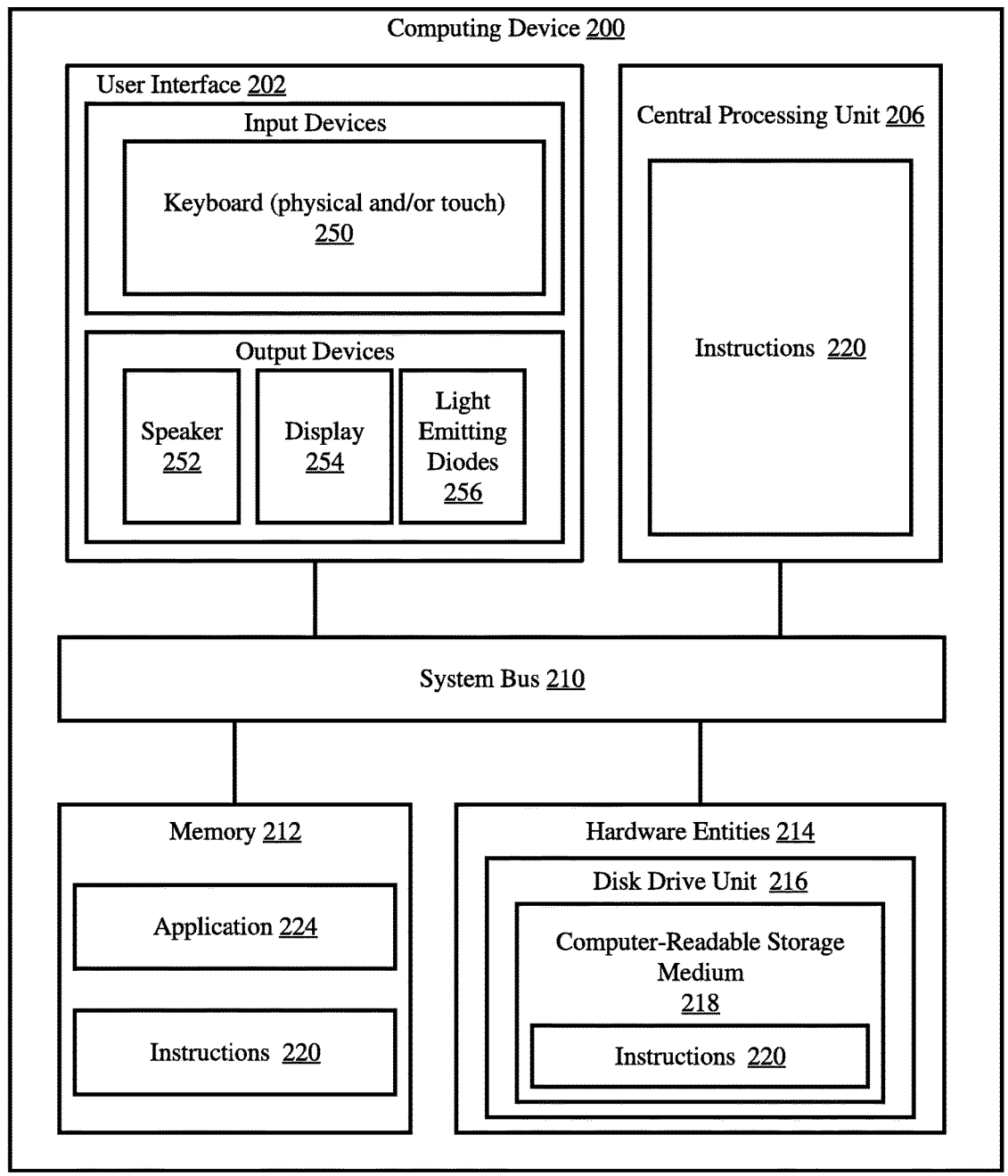
FIG. 2 is a block diagram of an illustrative computing device.

Referring to FIG. 2, there is provided a detailed block diagram of an exemplary architecture for a computing device 200. Client devices $102_1, \ldots, 102_N,$ server 106 and software testing device 110 of FIG. 1 are the same as or substantially similar to computing device 200. As such, the following discussion of computing device 200 is sufficient for understanding client devices $102_1, \ldots, 102_N,$ server 106 and software testing device 110. Notably, in some cases, the software testing device 110 comprises a plurality of computing devices. Each computing device of the plurality can be the same as or substantially similar to computing device 200.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to facilitate the present solution. As such, the computing device 200 of FIG. 2 implements at least a portion of a method for generating and operating a software product (e.g., software product 120 of FIG. 1) in accordance with the present solution.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

In some scenarios, the hardware entities 214 include an electronic circuit (e.g., a processor) programmed for testing source code (e.g., source code 112 of FIG. 1), generating code coverage data (e.g., code coverage data 114 of FIG. 1), using the code coverage data to identify code paths or branches of the source code which were not tested, modifying the source code to include commands for taking actions when execution of untested code paths are triggered, compiling the modified source code to produce a software product, and/or executing the software product. In this regard, it should be understood that the electronic circuit can access and run software application 224 installed on the computing device 200. The software application 224 implements all or a portion of the present solution.

Figure 3A:
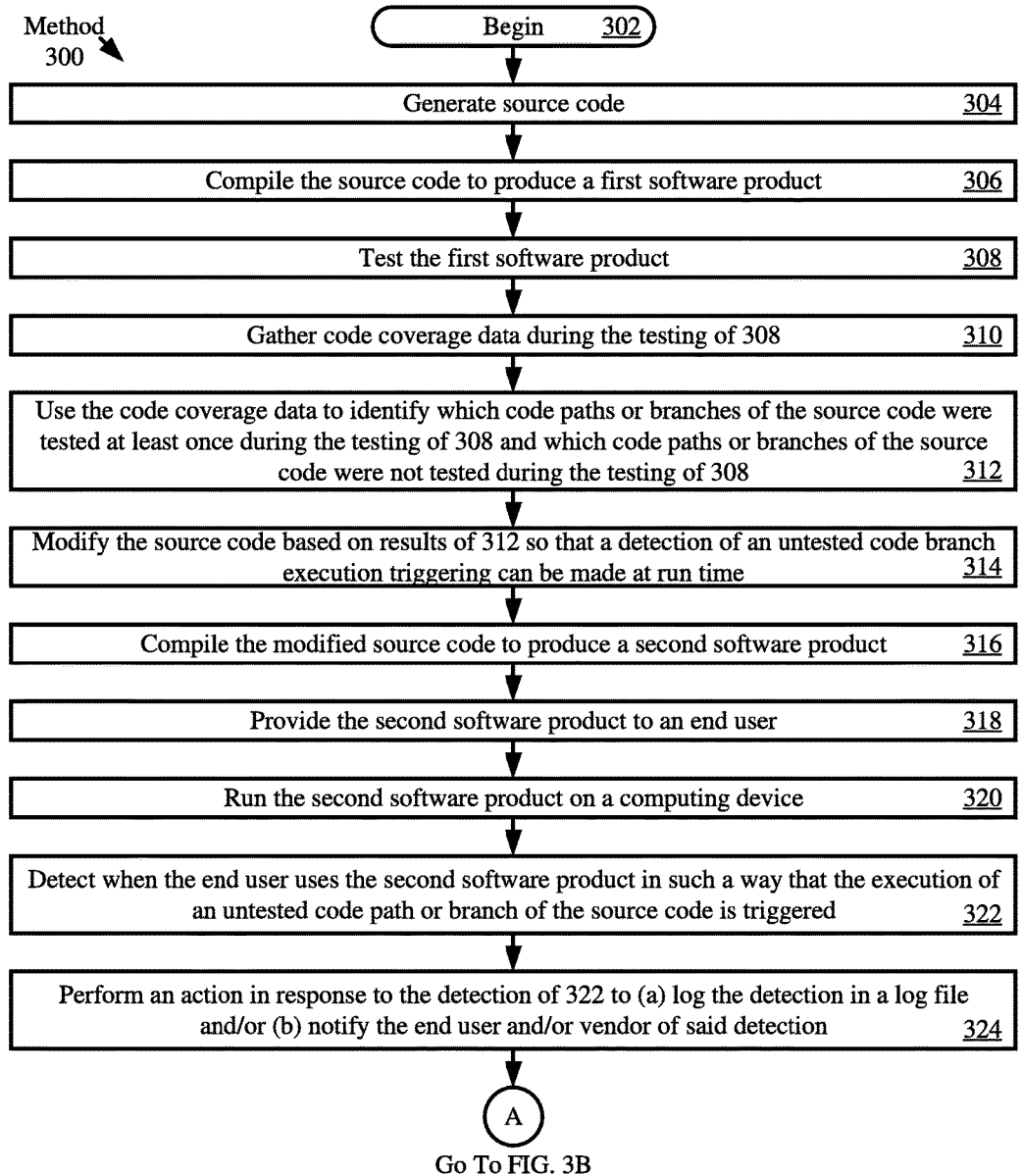
FIGS. 3A-3B (collectively referred to herein as FIG. 3) provide a flow diagram of an illustrative method for improving the quality of a software product through the detection of untested code execution.

Referring now to FIG. 3, there is provided a flow diagram of an illustrative method 300 for improving the quality of a software product through the detection of untested code execution. Method 300 begins with 302 and continues with 304 where source code (e.g., source code 112 of FIG. 1) is generated. The source code is compiled in 306 to produce a first software product (e.g., software product 118 of FIG. 1). The first software product is tested in 308. While the testing is being performed, code coverage data is gathered, as shown by 310. The operations of 304-310 are performed by a software testing device (e.g., software testing device 110 of FIG. 1).

Notably, the first software product is not exhaustively tested in 308. Accordingly, there are code paths or branches that were not exercised during the testing. For each code path or branch that was not tested, the vendor of the first software product does not know whether the corresponding feature works as intended. Thus, there is a risk of a defect in the first software product. As such, 312-314 are performed to provide a means to reduce the risk of end users unknowingly using defective features of the software product and/or to allow a vendor to become aware of and cure any defects in popular features of the software product relatively quickly. 312-314 involve: using the code coverage data to identify which code paths or branches of the source code were tested at least once during the testing of 308 and which code paths or branches of the source code were not tested during the testing of 308; and modifying the source code based on results of 312 so that a detection of an untested feature execution triggering can be made at run time. The operations of 312-314 are performed by the software testing device (e.g., software testing device 110 of FIG. 1) or another computing device (e.g., server 106 of FIG. 1).

In some scenarios, the source code is modified by inserting code for taking an action at the beginning of each code path or branch found to have been untested. The source code modification can be performed manually or automatically. The action to be taken can include, but is not limited to, notifying a vendor that a particular code path or branch is being executed or has been executed during end user use of the software program, logging a message to a log file, and/or notifying a user of the software program that execution of an untested feature or code path has been triggered. Upon completing 314, the modified source code is compiled in 316 to produce a second software product (e.g., software product 120 of FIG. 1). The second software product is then provided to an end user, as shown by 318. Thereafter, the end user installs and runs the second software product on a client computing device (e.g., client computing device $102_1, \ldots, 102_N$ of FIG. 1), as shown by 320. As the second software product runs, a detection is made when the end user uses the second software product in such a way that the execution of an untested code path or branch of the source code is triggered. In response to the detection of 322, an action is performed in 324 to (a) log the detection in a log file and/or (b) notify the end user and/or vendor of said detection. The end user notification can include, but is not limited to, a user-facing alert on a currently displayed window and/or in a newly displayed window. The vendor notification can include, but is not limited to, an email or other electronic communication. Next, method 300 continues with 326 or 328 of FIG. 3B.

Figure 3B:
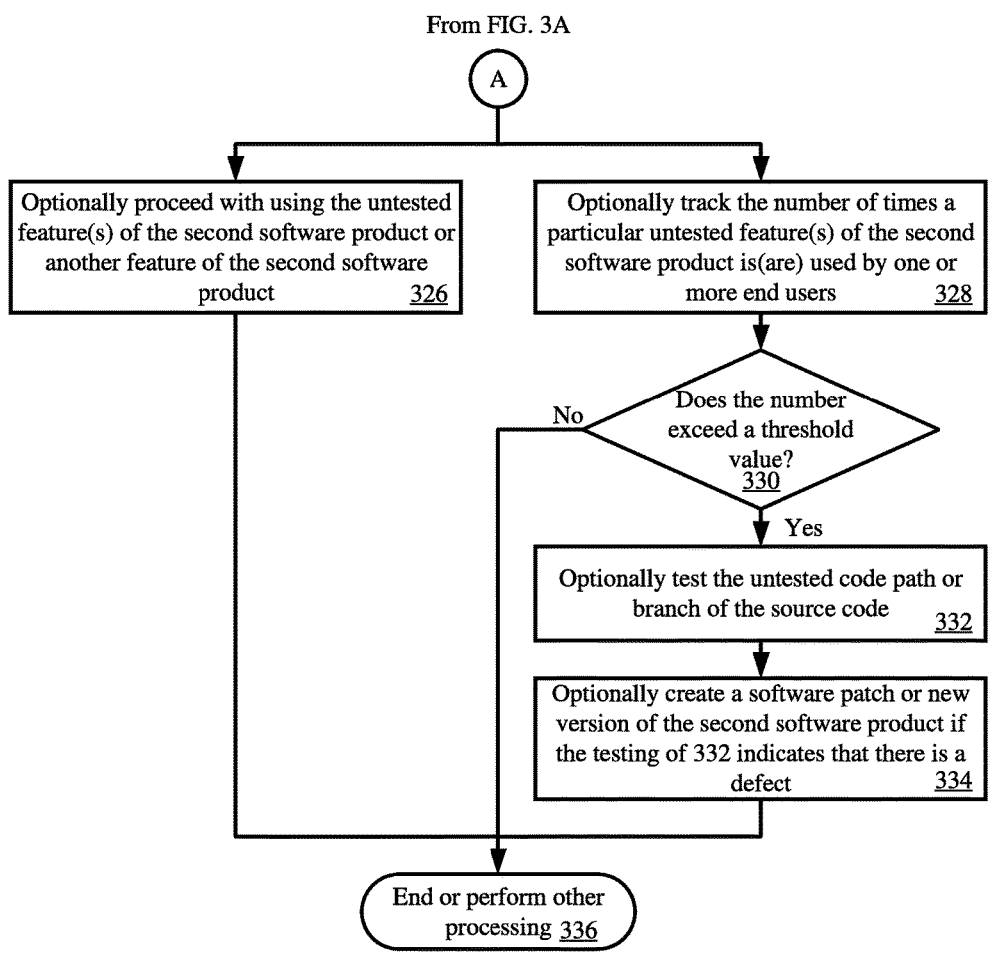

Referring now to FIG. 3B, 326 is performed when the end user is provided a notification in 324. 326 involves optionally proceeding with using the untested feature(s) of the second software product or another feature of the second software product.

In contrast, 328 is performed when the vendor is provided a notification in 324. 328 involves optionally tracking the number of times a particular untested feature(s) of the second software product is(are) used by one or more end users. If the number does not exceed a threshold value [330:NO], then 336 is performed where method 300 ends or other processing is performed. On the other hand, if the number does exceed the threshold value [330:YES], then 332 is optionally performed to test the untested code path or branch of the source code. In next 334, a software patch is optionally created if the testing of 332 indicates that there is a defect. Additionally or alternatively, 334 can also involve creating a new version of the second software product. Subsequently, 336 is performed where method 300 ends or other processing is performed.

Second Solution

The present solution has many novel features. For example, the present solution is able to: use a log-file analytics tool to automatically detect which portions of a software product were not tested during a testing process; compare log-lines for equality whilst ignoring changeable data; and notify a vendor and/or end user that an untested portion of the software product was executed while the software product was being used by an end user. The term "log", as used herein, refers to an automatically produced and time-stamped documentation of events that occur as software runs. The term "log-line", as used herein, refers to an entry in a log for a given event that occurred as software was being run. A log is automatically generated as the end user uses the software product. The log is provided from the end user's client device to a vendor's computing device for analysis by the log-file analytics tool (e.g., periodically, upon session completion, and/or in response to a user-software interaction). Notably, conventional log-final analytics tools do exist for performing health checks. However, these conventional log-final analytics tools are not configured to automatically detect which portions of a software product were not tested during a testing process.

The log-file analytics tool is able to detect when an end user is being exposed to the above-described risk of defect. This information may be of interest to the end user and to the vendor of the software product. In cloud-based scenarios, the log-file analytics tool of the present solution collects this information and stores it along with similar data from other end users so that a picture can be built of which untested code paths or branches are being exercised most often. These code paths or branches are then good candidates for adding targeted tests in order to mitigate this risk and hence increase product quality. A code path or branch comprises a route through a given part of code being executed. In some scenarios, the route is defined by a portion of the source code including an "if" statement and/or an "else" statement. For example, a portion of source code reads "if C then X else Y". In this case, after evaluating condition C, there are two routes, namely X and Y. The present solution is not limited to the particulars of this example.

Accordingly, the notification is useful to the end user so that the end user can decide whether or not to use the untested feature(s) of the software product. The notification is useful to the vendor so that the vendor can: track the number of times a particular untested feature(s) of the software product are used by one or more end users; and determine if the number exceeds a threshold value. If so, the vendor can test the untested feature(s) of the software product. Based on results of the additional testing, the vendor can create and distribute a software patch or new versions of the software product to end users. The present solution is not limited to the measures described here. The vendor and/or end user can take other measures in response to the notification(s).

Figure 4:
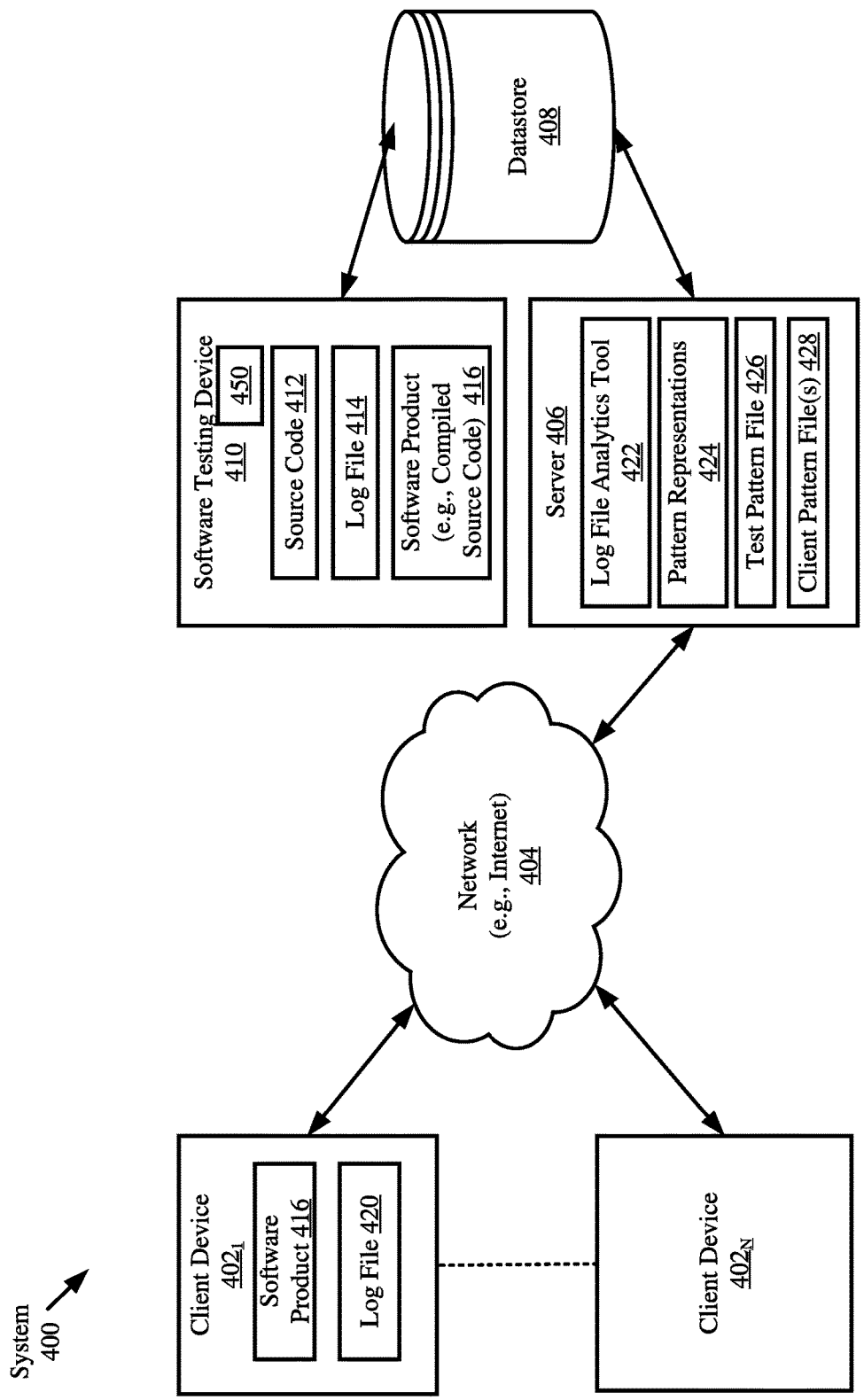
FIG. 4 is an illustration of an illustrative system.

Referring now to FIG. 4, there is provided an illustration of an illustrative system 400. System 400 is generally configured to automatically detect untested code that was executed by client devices. Accordingly, system 400 comprises a plurality of client devices $402_1, \ldots, 402_N$, a network 404, a server 406, a datastore 408, and a software testing device 410.

Prior to product release, the software testing device 410 runs a software product 416 through a sequence of test cases 450 to test a portion of a plurality of code paths or branches of its source code 412. A code path or branch comprises a route through a given part of code being executed. Techniques for testing software products are well known in the art, and therefore will not be described in detail herein. Any known or to be known technique can be used herein without limitation.

The software testing device 410 generates a log file 414 while the software product 416 is being tested. The log file 414 includes information indicating which portions of the source code 412 (or code paths) were executed at least once during testing. An illustrative log file generated during software testing is provided below.

. . .
Adding 100 to 200, status is now GOOD
Adding 50 to 50, status is now BAD
Adding 150 to 30, status is now UNKNOWN
. . .

Each entry of the log file is referred to herein as a log-line. The log file 414 can be stored in a local memory of the software testing device 410 and/or in the datastore 408.

After the testing is successfully completed (e.g., no defects were detected), the software product 416 is released and provided to end users. In this regard, the software product 416 is installed and run on client devices 402₁, . . . , 402_N. A log file 420 is generated while the software product 416 is running. The log file 420 includes information indicating which features of the software product 416 were executed during use thereof. An illustrative log file generated during software product execution is provided below.

. . .
Adding 20 to 40, status is now GOOD
Multiplying 10 by 20, status is now GOOD
Adding 100 to 200, status is now BAD
. . .

Each entry of the log file is referred to herein as a log-line. The log file 420 is provided to the server 406 for analysis. Log files can be communicated from the client devices to the server (via network 404) periodically, at session completion, and/or in response to a user-software interaction. Accordingly, the log file 420 may be stored in local memory of a client device, a local memory of the server, and/or datastore 408.

At the server 406, a log file analytics tool 422 performs operations to convert or transform each log-line of the log files 414, 420 into respective pattern representations. This conversion or transformation is achieved by: comparing each log-line to a pre-defined set of pattern representations 424; identifying which pattern representation covers or is satisfied by the log-line's content; and generating a new pattern file or list 426, 428 in which the log-line's content is replaced with the identified pattern representations. A pattern representation comprises a general pattern format for all possible log file entries resulting from an execution of a particular portion of the software product's source code. Accordingly, a pattern representation can be satisfied by a plurality of different log entries of a log file generated in a testing environment and a client environment by executing a particular portion of the software product's code. For example, the general pattern format includes: "Adding [an integer number] to [an integer number], status is now [character string]". The present solution is not limited in this regard.

In some scenarios, the pre-defined set of pattern representations 424 comprises regular expressions derived from the source code 412. Illustrative source code is provided below.

. . .
log("Adding % d to % d, status is now % s", a, b, status)
. . .
log("Multiplying % d by % d, status is now % s", a, b, status)
. . .

From the above log-lines, knowledge is gained that a is an integer, b is an integer, and status is a string. Deeper analysis of the source code 412 could show subsets of integers and strings that are possible.

A regular expression comprises a general format string which would be matched by a plurality of different log entries generated by executing a particular portion of the source code. Illustrative regular expressions for the above log entries of the source code are provided below.

^Adding [0-9]* to [0-9]*, status is now.*$
^Multiplying [0-9]* by [0-9]*, status is now.*$ The first regular expression would match any log-line generated by running the code statement: log("Adding % d to % d, status is now % s", a, b, status). Similarly, the second regular expression would match any log-line generated by running the code statement: log("Multiplying % d by % d, status is now % s", a, b, status).

The regular expressions are then used to convert or transform each log-line of the log files 414, 420. The following Tables 1 and 2 illustrate such conversions or transformations.

TABLE 1

| Log-Line In Log File 414 | Regular Expression |
|---|---|
| Adding 100 to 200, status is now GOOD | ^Adding [0-9]* to [0-9]*, status is now .*$ |
| Adding 50 to 50, status is now BAD | ^Adding [0-9]* to [0-9]*, status is now .*$ |
| Adding 150 to 30, status is now UNKNOWN | ^Adding [0-9]* to [0-9]*, status is now .*$ |

TABLE 2

| Log-Line In Log File 420 | Regular Expression |
|---|---|
| Adding 20 to 40, status is now GOOD | ^Adding [0-9]* to [0-9]*, status is now .*$ |
| Multiplying 10 by 20, status is now GOOD | ^Multiplying [0-9]* by [0-9]*, status is now .*$ |
| Adding 100 to 200, status is now BAD | ^Adding [0-9]* to [0-9]*, status is now .*$ |

Accordingly, the test pattern file 426 includes the following content.

. . .
^Adding [0-9]* to [0-9]*, status is now .*$
^Adding [0-9]* to [0-9]*, status is now .*$
^Adding [0-9]* to [0-9]*, status is now .*$
. . .

Notably, the test pattern file or list 426 can be processed to remove duplicate entries therefrom. In this case, the test pattern file or list 426 would simply include one "^Adding [0-9]* to [0-9]*, status is now .*$" entry rather than three. The client pattern file or list 428 includes the following content.

. . .
^Adding [0-9]* to [0-9]*, status is now .*$
^Multiplying [0-9]* by [0-9]*, status is now .*$
^Adding [0-9]* to [0-9]*, status is now .*$
. . .

The client pattern file or list 428 can be processed to remove duplicate entries therefrom. In this case, the client pattern file or list 428 would simply include one "^Adding [0-9]* to [0-9]*, status is now .*$" entry rather than two. The present solution is not limited to the particulars of this illustrative scenario.

Next, the client pattern file or list 428 is compared to the test pattern file or list 426. This comparison is performed to detect any anomalies in the client pattern file or list 428 (i.e., any pattern representations that are not contained in the test pattern file or list 426). For example, in accordance with the above example, the pattern representation "^Multiplying [0-9]* by [0-9]*, status is now .*$" is contained in the client pattern file or list 428 and not in the test pattern file or list 426. Thus, a determination is made that the code path or branch of the source code 412 associated with the pattern representation "^Multiplying [0-9]* to [0-9]*, status is now .*$" is an untested code path or branch which was executed during use of the software product 416. The present solution is not limited to the particulars of this example.

In response to this determination, one or more of the following operations are performed: raising a warning to the end user; raising a warning to the vendor; and/or combining this fact with data from previously analyzed log-files (e.g., stored in the datastore 408) to record which untested code path was executed. The information gleaned by the log-file analytics tool 422 can be very useful for purposes other than detecting and notifying of untested code paths execution. For example, when aggregating the information obtained from several end users, valuable information can be gleaned about how often certain features are used, and the behavior of those features (as represented by paths taken within the code).

It would also be valuable for the vendor of the product to know when a user of the product causes any such untested code path to be executed. This would be useful from the point of view of managing risks related to product quality. If a large number of end users are exercising a particular untested code path, this is a good candidate for adding a targeted test.

Referring back to FIG. 2, there is provided a detailed block diagram of an exemplary architecture for a computing device 200. Client devices $402_1, \ldots, 402_N$, server 406 and software testing device 410 of FIG. 4 are the same as or substantially similar to computing device 200. As such, the following discussion of computing device 200 is sufficient for understanding client devices $402_1, \ldots, 402_N$, server 406 and software testing device 410. Notably, in some cases, the software testing device 410 comprises a plurality of computing devices. Each computing device of the plurality can be the same as or substantially similar to computing device 200.

Figure 5A:
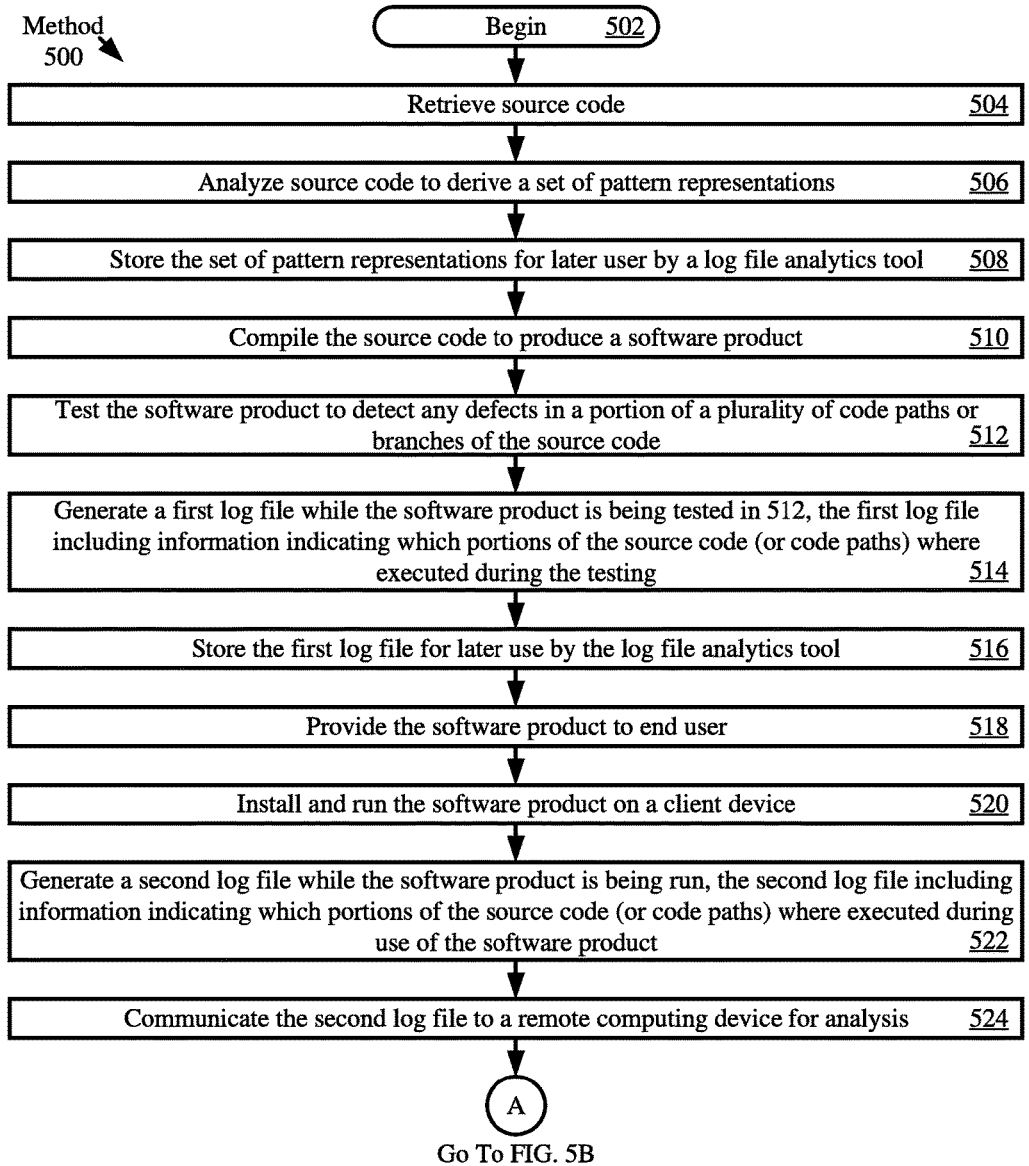

Referring now to FIG. 5, there is provided a flow diagram of an illustrative method 500 for improving the quality of a software product through the detection of untested code execution. The present solution is not limited to the order in which operations 504-548 are performed. The operations 504-548 can be performed in a different order than that shown in FIG. 5. For example, 506-508 can alternatively be performed after 524 of FIG. 5A and before 526 of FIG. 5B.

As shown in FIG. 5A, method 500 begins with 502 and continues with 504 where source code (e.g., source code 412 of FIG. 4) is retrieved. The source code can be retrieved from a memory location of a software testing device (e.g., software testing device 410 of FIG. 4) or from a datastore (e.g., datastore 408 of FIG. 4) remote from the software testing device. The source code is analyzed in 506 to derive a set of pattern representations (e.g., pattern representations 424 of FIG. 4). This analysis can be performed by the software testing device or by another computing device (e.g., server 406 of FIG. 4). Next in 508, the set of pattern representations are stored for later use by a log file analytics tool (e.g., log file analytics tool 422 of FIG. 4). The pattern representations can be stored in a local memory of a computing device (e.g., the software testing device 410 and/or the server 406 of FIG. 4) or in a datastore (e.g., datastore 408 of FIG. 4) remote from the computing device. The source code is compiled in 510 to produce a software product (e.g., software product 416 of FIG. 4).

In 512, the software product is tested to detect any defects in a portion of a plurality of code paths or branches in the source code. A first log file (e.g., log file 414 of FIG. 4) is generated while the software product is being tested, as shown by 514. The first log file includes information indicating which portions of the source code (or code paths) were executed during the testing. The first log file is stored for later use by the log file analytics tool. The first log file can be stored in a local memory of the computing device (e.g., the software testing device 410 and/or the server 406 of FIG. 4) or in a datastore (e.g., datastore 408 of FIG. 4) remote from the computing device.

If the testing was successful (e.g., no defects were found), the software product is released and provided to end users, as shown by 518. As such, the software product is installed and run on a client device (e.g., client device $402_1, \ldots, 402_N$ of FIG. 4), as shown by 520. A second log file (e.g., log file 420 of FIG. 4) is generated while the software product is being run, as shown by 532. The second log file includes information indicating which portions of the source code (or code paths) were executed during use of the software product. The second log file is communicated in 524 from the client device to a remote computing device (e.g., server 406 of FIG. 4) for analysis. Thereafter, method 500 continues with 526 of FIG. 5B.

As shown in FIG. 5B, 526 involves using the log file analytics tool to convert or transform each log-line of the first and second log files into a respective pattern representation. This conversation/transformation is achieved by: comparing each log-line of the respective log file to the set of pattern representations; and identifying which pattern representation covers, matches or is satisfied by the log-line's content. First and second pattern files or lists (e.g., test pattern file 426 and client pattern file 428 of FIG. 4) are generated in 528-530. The first pattern file or list includes the pattern representation(s) for the log-lines of the first log file. Similarly, the second pattern file or list includes the pattern representation(s) for the log-lines of the second log file. The first and second pattern files or lists are compared to each other in 522 to detect any differences therebetween. The results of the comparison operations are used in 534 to identify the code path(s) or branch(es) of the source code which was(were) not tested during the testing of the software product but which was(were) executed during use of the software product by an end user.

An action is performed in 536 responsive to an identification of an untested code path or branch in 534. The action is performed to (a) log such an identification in a file and/or (b) notify the end user and/or vendor of said identification. If action (b) is taken, then method 500 may continue with optional 538 or optional 540-546. 538 involves optionally continue or discontinue use of the untested feature of the software product. 540-546 involve optionally: tracking the number of times the untested feature of the software product is used by one or more end users; determining if the number exceeds a threshold value; testing the untested code path or branch of the software product's source code if the threshold value is exceeded; and/or creating a software patch or new version of the software product if the testing indicates that there is a defect. Subsequent to completing 538, 542 or 536, 548 is performed where method 500 ends or other processing is performed.

Figure 6:
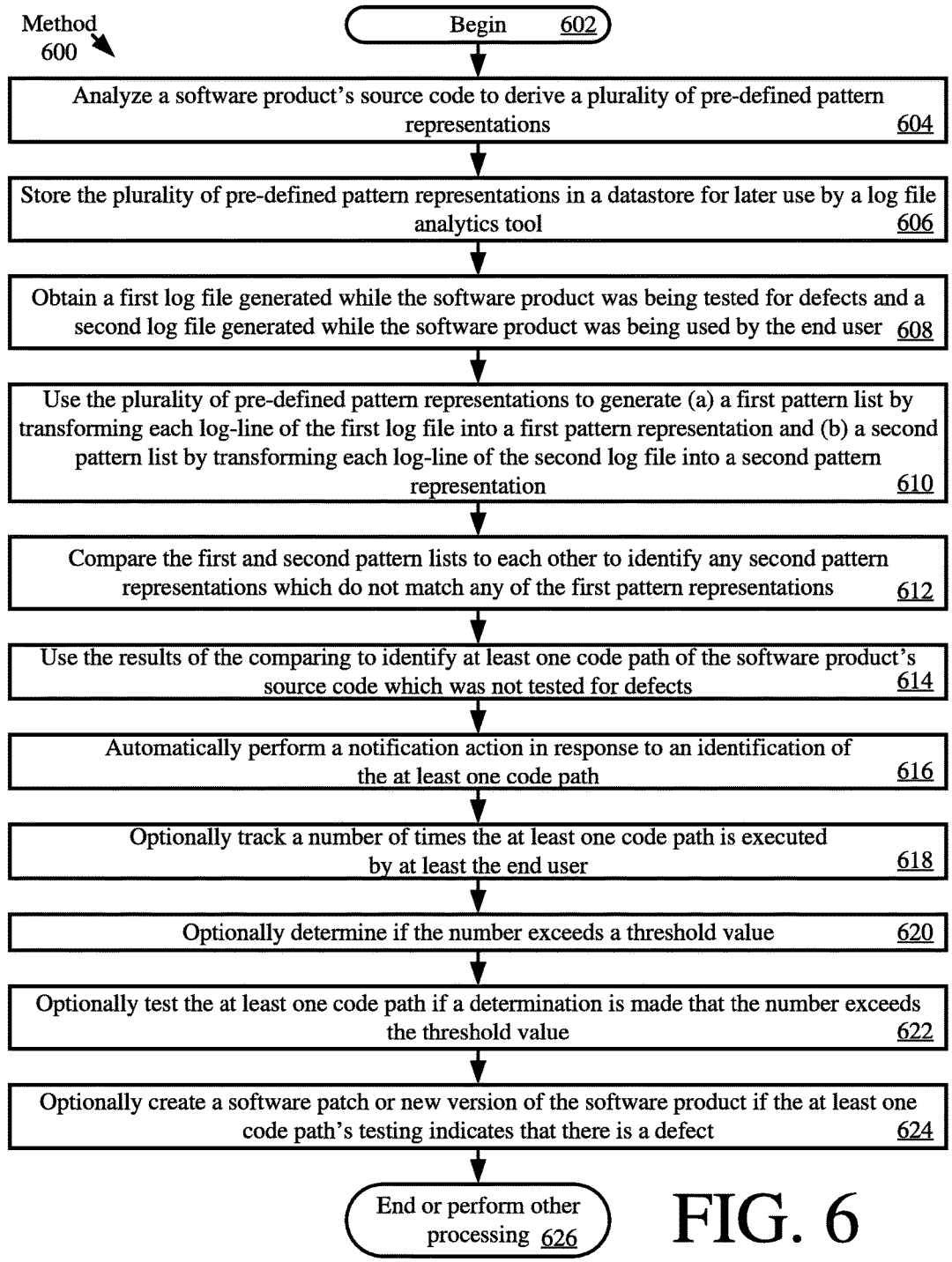
FIG. 6 is a flow diagram of an illustrative method for better understanding how a software product is being used by an end user.

Referring to FIG. 6, there is provided a flow diagram of an illustrative method 600 for better understanding how a software product (e.g., software product 416 of FIG. 4) is being used by an end user. All or some of the operations 604-624 can be performed by one or more computing devices (e.g., software testing device 410 and/or server 406 of FIG. 4). Also, the present solution is not limited to the order in which operations 604-624 are performed. The operations 604-624 can be performed in a different order than that shown in FIG. 6.

The method 600 begins with 602 and continues with 604 where the software product's source code is analyzed to derive a plurality of pattern representations (e.g., regular expressions). The pattern representations (e.g., pattern representation 424 of FIG. 4) are stored in a datastore for later use by a log file analytics tool (e.g., log file analytics tool 422 of FIG. 4), as shown by 606.

In next 608, first and second log files are obtained. The first log file (e.g., log file 414 of FIG. 4) was generated while the software product was being tested for defects. In contrast, the second log file (e.g., log file 420 of FIG. 4) was generated while the software product was being used by the end user. The plurality of pattern representations are then used in 610 to generate (a) a first pattern list by transforming each log-line of the first log file into a first pattern representation and (b) a second pattern list by transforming each log-line of the second log file into a second pattern representation. Each of the pre-defined pattern representations comprises a general pattern format for all possible log file entries resulting from an execution of a particular portion of the software product's source code. Next in 612, the first and second pattern lists are compared to each other to identify any second pattern representations which do not match any of the first pattern representations. The results of the comparing are used in 614 to identify at least one code path of the software product's source code which was not tested for defects. A notification action is then automatically performed in response to an identification of the at least one code path, as shown by 616. The notification action can include, but is not limited to, logging information identifying the at least one code path, and/or providing a notification message or alert to the end user or the software product's vendor.

Upon completing 616, method 600 may optionally continue with 618-624. 618-624 involve: tracking a number of times the at least one code path is executed by at least the end user; and determining if the number exceeds a threshold value; testing the at least one code path if a determination is made that the number exceeds the threshold value; and/or creating a software patch or new version of the software product if the at least one code path's testing indicates that there is a defect. Subsequently, 626 is performed where method 600 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for improving the quality of a first software product, comprising:
   performing operations by a computing device to run the first software product generated by compiling source code modified based on code coverage data gathered during testing of the first software product prior to release on a market, the code coverage data identifying at least one first portion of the source code which was executed at least once during the testing and identifying at least one second portion of the source code which was not executed during the testing;
   automatically detecting when an execution of the second portion is triggered while the first software product is being used by an end user subsequent to being released on the market;
   automatically performing a notification action in response to said detecting; and
   mitigating a risk of defect in the first software product based on the notification action through an end user data-driven triggering of additional testing for untested portions of the source code subsequent to when the first software product has been released.

2. The method according to claim 1, wherein the first portion and second portion each comprise a code path through a given part of the source code.

3. The method according to claim 1, wherein the notification action comprises logging a warning message for said detecting.

4. The method according to claim 1, wherein the notification action comprises sending an electronic communication from the computing device to a remote device of the software product's vendor.

5. The method according to claim 1, wherein the notification action comprises alerting the end user of the detecting.

6. The method according to claim 1, wherein the detecting is made at run time of the second portion.

7. The method according to claim 1, further comprising using the code coverage data to identify which code paths of the source code were tested at least once during the testing and which code paths of the source code were not tested during the testing.

8. The method according to claim 7, further comprising modifying the source code by inserting a command for taking the notification action at the beginning of each code path found to have been untested.

9. The method according to claim 1, further comprising:
   tracking a number of times the second portion is used by at least the end user;
   determining if the number exceeds a threshold value; and
   improving the quality of the first software product if a determination is made that the number exceeds the threshold value by
      adding a test for the second portion to an additional testing process, and
      performing the additional testing process to test the second portion.

10. The method according to claim 9, further comprising creating a software patch or new version of the software product if the second portion's testing indicates that there is a defect.

11. A system, comprising:
- at least one processing element; and
- a non-transitory computer-readable storage medium comprising programming instructions that are configured to cause the at least one processing element to implement a method for improving the quality of a first software product, wherein the programming instructions comprise instructions to:
  - run the first software product generated by compiling source code modified based on code coverage data gathered during testing of the first software product prior to release on a market, the code coverage data identifying at least one first portion of the source code which was executed at least once during the testing and identifying at least one second portion of the source code which was not executed during the testing;
  - detect when an execution of the second portion is triggered while the first software product is being used by an end user;
  - perform a notification action in response to said detecting; and
  - mitigate a risk of defect in the first software product based on the notification action through an end user data-driven triggering of additional testing for untested portions of the source code subsequent to when the first software product has been released.

12. The system according to claim 11, wherein the first portion and second portion each comprise a code path through a given part of the source code.

13. The system according to claim 11, wherein the notification action comprises logging a warning message for said detecting.

14. The system according to claim 11, wherein the notification action comprises sending an electronic communication from the computing device to a remote device of the software product's vendor.

15. The system according to claim 11, wherein the notification action comprises alerting the end user of the detecting.

16. The system according to claim 11, wherein the triggering of the second portion's execution is detected at run time of the second portion.

17. The system according to claim 11, wherein the programming instructions comprise instructions to use the code coverage data to identify which code paths of the source code were tested at least once during the testing and which code paths of the source code were not tested during the testing.

18. The system according to claim 17, wherein the programming instructions comprise instructions to modify the source code by inserting a command for taking the notification action at the beginning of each code path found to have been untested.

19. The system according to claim 11, wherein the programming instructions comprise instructions to:
- track a number of times the second portion is used by at least the end user; and
- determine if the number exceeds a threshold value.

20. The system according to claim 19, wherein
- the second portion is tested if a determination is made that the number exceeds the threshold value, and
- a software patch or new version of the software product is created if the second portion's testing indicates that there is a defect.

* * * * *